United States Patent [19]
Hofstetter et al.

[11] Patent Number: 5,658,214
[45] Date of Patent: Aug. 19, 1997

[54] DIFFERENTIAL DRIVE

[75] Inventors: Johann Hofstetter, Reischach; Manfred Hofer, Gais, both of Italy

[73] Assignee: GKN Viscodrive GmbH, Lohmar, Germany

[21] Appl. No.: 596,990

[22] Filed: Feb. 5, 1996

[30] Foreign Application Priority Data

Feb. 10, 1995 [IT] Italy .................. MI95A0243

[51] Int. Cl.$^6$ .................................................. F16H 48/10
[52] U.S. Cl. .......................... 475/249; 475/252; 475/346
[58] Field of Search ...................... 475/248, 249, 475/252, 253, 346

[56] References Cited

U.S. PATENT DOCUMENTS

| | | | |
|---|---|---|---|
| 1,258,177 | 3/1918 | Baker | 475/249 |
| 2,651,215 | 9/1953 | Schoenrock | 475/249 |
| 3,060,765 | 10/1962 | Rinsoz | 475/252 |
| 3,768,336 | 10/1973 | Wharton | 475/252 |
| 4,012,968 | 3/1977 | Kelbel . | |
| 4,058,027 | 11/1977 | Webb . | |
| 4,224,838 | 9/1980 | Roushdy et al. . | |
| 4,836,051 | 6/1989 | Guimbretiere . | |
| 4,905,808 | 3/1990 | Tomita et al. . | |
| 4,966,268 | 10/1990 | Asano et al. . | |
| 4,982,808 | 1/1991 | Taureg et al. . | |
| 4,986,802 | 1/1991 | Scoville et al. | 475/346 |
| 5,007,515 | 4/1991 | Shimizu . | |
| 5,007,885 | 4/1991 | Yamamoto et al. . | |
| 5,012,908 | 5/1991 | Kobayashi et al. . | |
| 5,031,743 | 7/1991 | Morishita et al. . | |
| 5,036,963 | 8/1991 | Murata . | |
| 5,056,640 | 10/1991 | Yamamoto . | |
| 5,063,738 | 11/1991 | Asano et al. . | |
| 5,070,975 | 12/1991 | Tanaka et al. . | |
| 5,080,187 | 1/1992 | Asano et al. . | |
| 5,127,503 | 7/1992 | Gratzer . | |
| 5,129,870 | 7/1992 | Pierce . | |
| 5,178,249 | 1/1993 | Haga et al. . | |
| 5,197,583 | 3/1993 | Sakai et al. . | |
| 5,259,488 | 11/1993 | Oberdorster et al. . | |
| 5,261,862 | 11/1993 | Pierce . | |
| 5,267,916 | 12/1993 | Beim et al. . | |

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |
| 4103054 | 8/1991 | Germany . |
| 4032245 | 3/1992 | Germany . |
| 6487928 | 4/1989 | Japan . |
| 1-126440 | 5/1989 | Japan . |
| 1-220728 | 9/1989 | Japan . |
| 2-51626 | 2/1990 | Japan . |
| 2-120529 | 5/1990 | Japan . |
| 2-120530 | 5/1990 | Japan . |
| 3-37455 | 2/1991 | Japan . |
| 369829 | 3/1991 | Japan . |
| 2202602 | 9/1988 | United Kingdom . |
| 2222232 | 2/1990 | United Kingdom . |

*Primary Examiner*—Charles A. Marmor
*Assistant Examiner*—Nathan O. Jensen
*Attorney, Agent, or Firm*—Dinnin & Dunn, P.C.

[57] ABSTRACT

A differential drive having a drivable differential carrier supported in a drive house. The differential drive includes two axle shaft gears which are coaxially supported in a first bore. A plurality of pairs of differential gears which are eccentrically supported in an axis-parallel way in the differential carrier second and third bores. The longer hub extension opposed to a region of engagement with the associated axle shaft gear is radially fixed. The shorter hub extension adjoining a region of engagement with an associated axle shaft gear is laterally guided in a radial direction.

11 Claims, 2 Drawing Sheets

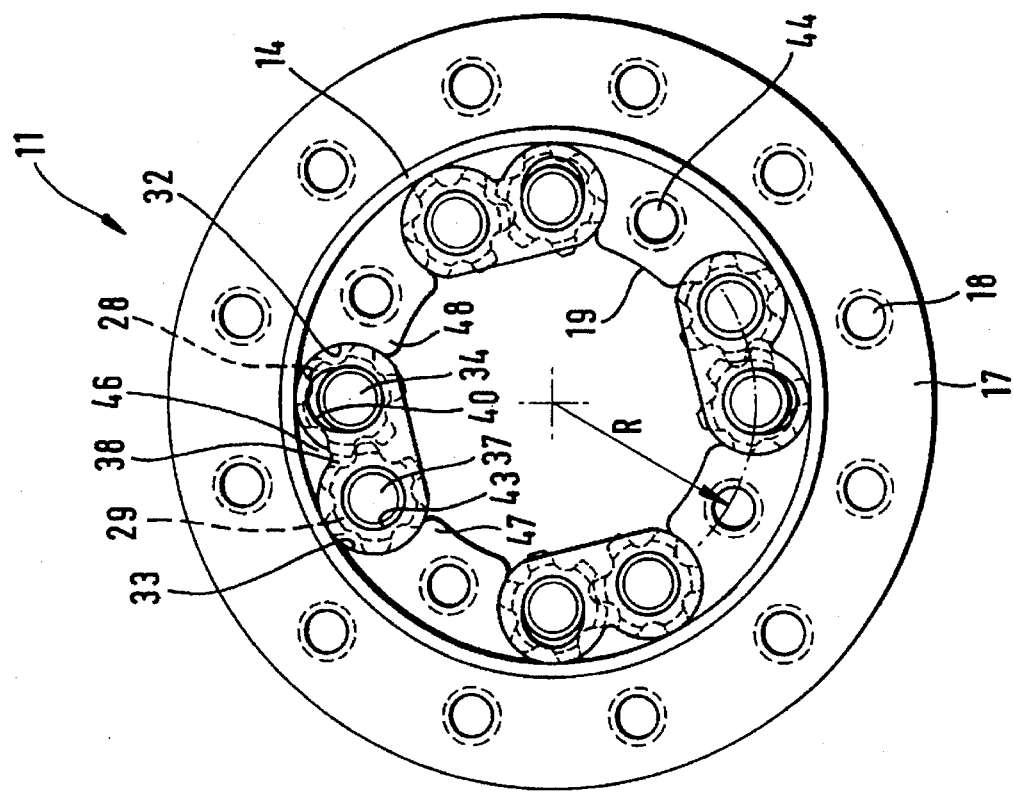
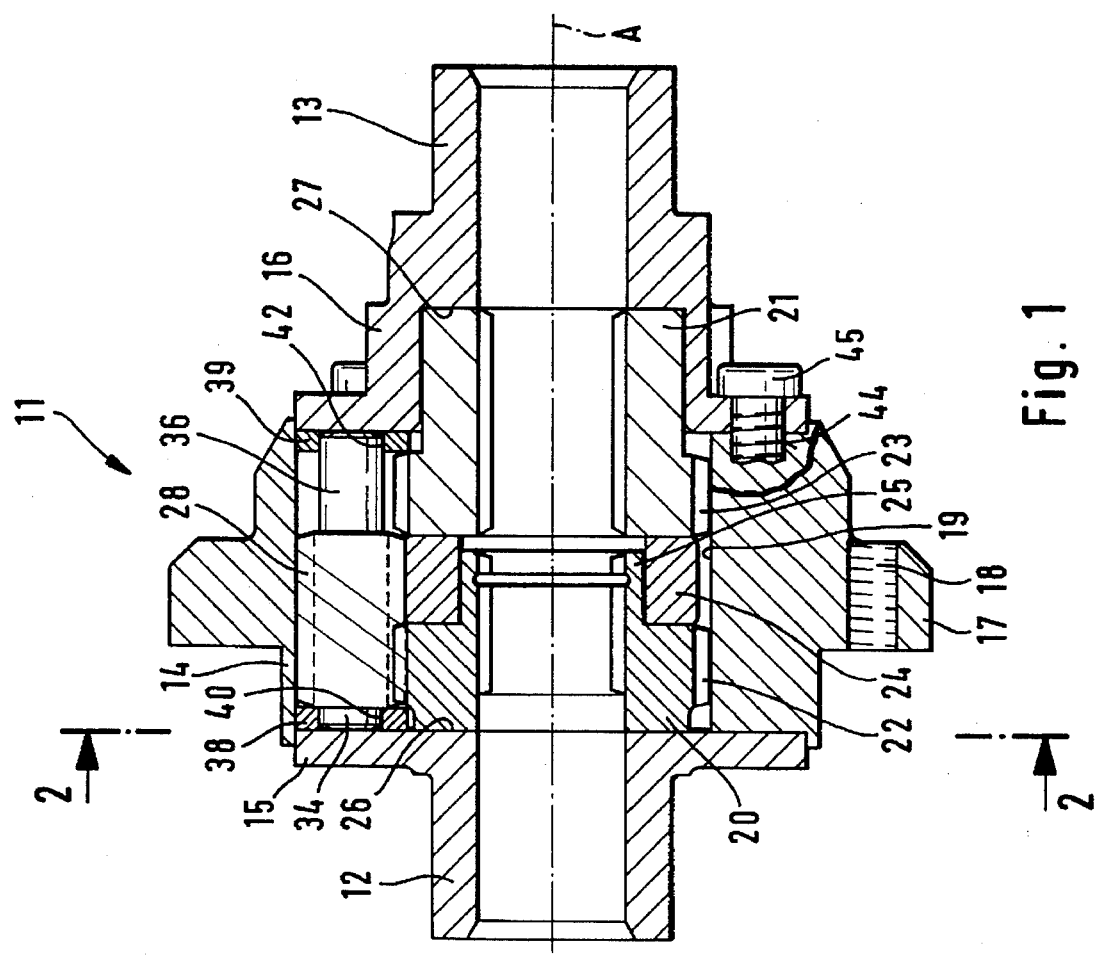

DIFFERENTIAL DRIVE

BACKGROUND OF THE INVENTION

The invention relates to a differential drive having a drivable differential carrier supported in a drive housing so as to be rotatable around an axis, having two axle shaft gears which are coaxially supported one behind the other in said differential carrier in first bores and which are each provided with outer toothing and which are connectable to axle shafts emerging from the differential carrier, having a plurality of pairs of differential gears which are supported eccentrically and in an axis-parallel way in said differential carrier in second and third bores and which are each provided with outer toothing covering a portion of the length of same and with hub extensions of different lengths adjoining said outer toothing at both ends, with the differential gears of the individual pairs being oriented in different directions relative to one another, with the first bores intersecting the second and third bores and the latter ones intersecting one another, and with the first axle shaft gear engaging the first differential gears of the individual pairs and with the second axle shaft gear engaging the second differential gears of the individual pairs and with the differential gears of the individual pairs engaging one another in at least one axially overlapping region of their outer toothing and with the differential gears, for the purpose of generating friction forces, being supported in the second and third bores by means of the tooth heads of their outer toothing.

Differential drives of this type are known from DE 37 07 872 A1 for example. In the case of differential movements between the axle shaft gears in the differential drive, the differential gears are supported in the second and third bores by means of their tooth heads, thus generating considerable friction forces which adversely affect the efficiency of the differential drive. This specifically causes a slip-limiting effect between the axle shafts. The differential gears of the prior art drive comprise so-called hub extensions by means of which they are axially supported on end faces of their respective bores. Said hub extensions ensure that the differential gears are accurately axially positioned in the bores for the differential gears, which bores are uniformly extending over the entire housing length. Such support with the help of hub extensions is necessary, especially in the case of the helical gearing of the axle shaft gears and differential gears of prior art drives, which helical gearing generates axial forces. The hub extensions do not have a bearing function.

The direction and magnitude of the above-mentioned supporting forces of the differential gears relative to the differential carrier in the case of differential movements in the differential carrier depend on the geometric relations such as diameter ratios and angles of helical pitch as well as torque introduced. As a result of the mutual engagement of teeth, forces comprising a tangential component may be introduced into the differential carrier. Whereas normally, the resulting radial component of such forces is directed outwardly, it is possible for an inwardly directed radial component to occur as well.

Therefore, in the case of differential drives of said type, the edge regions along the lines of intersection of said second and third bores relative to one another, as well as the edge regions along the lines of intersection of said second and third bores relative to the first bores, are subject to particularly high loads. This may lead to excessive wear and edge fracture, which represent undesirable results and which may affect the predetermined slip-limiting effect of the drive.

From U.S. Pat. No. 5,122,101 there is known a differential drive of a similar design wherein the second and third bores in the differential carrier are also of the same length and wherein the differential gears comprise corresponding axial extensions. However, said axial extensions do not serve as axial spacing members, as described above, but as radial bearing journals by means of which the differential gears, at both ends, are supported in end housing parts. In consequence, the differential gears are held with play in their bores so that the tooth heads run in a friction-free way relative to the bores. As far as, with a differential drive of this type, there occurs a slip-limiting effect between the axle shafts, it occurs entirely as a result of the axial thrust which is generated by helical toothing of the axle shaft gears and differential gears and leads to friction forces of the axle shaft gears and differential gears at the end faces of the differential carrier. The slip-limiting effect is thus correspondingly lower.

It is the object of the present invention to provide a drive of the initially mentioned type, i.e. a drive wherein friction is generated at the tooth heads of the differential gears relative to the differential carrier and wherein there are provided means which relieve the load on said surface regions of the differential carrier in the region near the edges and which are formed by the second and third bores penetrating one another and each penetrating the first bores and which permit a precision adjustment of the slip-limiting effect.

The objective is achieved in that at each differential gear, the longer hub extension distal from the region of engagement with the associated axle shaft gear is fixed radially and that the shorter hub extension adjoining the region of engagement with the associated axle shaft gear is laterally guided in the radial direction. This measure ensures that the circumferential components of the forces resulting from the tooth forces between the differential gears are introduced into the differential carrier by the hub extensions whereas the outwardly directed radial components of the resulting forces applied to the differential gears are introduced in a friction-generating way by means of the tooth heads into the surface parts of the second and third bores in regions which extend substantially tangentially relative to the housing axis. Said circumferential components of the resulting forces subjecting the edges to loads are thus eliminated, whereas the function of the friction forces increasing slip-limiting effect is maintained in principle. The dangerous edge pressure is avoided in an advantageous way.

To avoid any indifferent conditions of engagement between the pairs of differential gears, the longer hub extension distal from the region of engagement with the associated axle shaft gear is fixed radially, whereas, in accordance with the invention, the shorter hub extension adjoining the region of engagement with the associated axle shaft gear is laterally guided with radial play to be able to generate the friction forces in the bores, which friction forces are essential for this type of differential drive.

According to the preferred embodiment it is proposed that at each differential gear, the shorter hub extension adjoining the region of engagement with the associated axle shaft gear is supported radially inwardly. This measure allows any possible inwardly directed radial components of the resulting forces applied to the differential gears to be introduced by the hub extensions into the differential carrier in such a way that especially those forces are eliminated which act on the edges in the region where the first and second bores penetrate the third bore.

In an advantageous embodiment, there are provided pairs of bearing plates for jointly supporting and guiding adjoining hub extensions of the pairs of differential gears, which bearing plates each comprise a centric bearing bore for the longer hub extension and an oblong hole—extending radially relative to the drive axis—for the shorter hub extension of each of the two adjoining differential gears of a pair of differential gears. In respect to their bores or oblong holes, said pairs of bearing plates are arranged at the two ends of the housing so as to be orientated in opposite senses. Said bearing plate embodiment which optimizes the engagement of the toothings of the two differential gears of one pair may comprise an angle of the longitudinal axis of the oblong hole, which deviates from the entirely radial direction in order to influence the friction forces at the tooth heads in the second and third bores. Using said bearing plates is also advantageous in that, with an unchanged housing geometry, it is possible to use different sets of gears in a differential drive. In this way it is possible to modify certain design aspects without having to introduce an entirely new layout of the overall concept. It is possible to vary the rolling circle of the axle shaft gears and the rolling circle of the differential gears as well as the helical pitch of the toothing, with the differential carrier being adapted by exchanging the bearing plates.

According to an advantageous embodiment, the bearing plates—if viewed in a cross-section through the drive—are form-fittingly inserted into the differential carrier. Suitable recesses for the bearing plates may be provided in cover parts or in an axial central portion of the differential carrier.

Normally, the differential carrier consists of an axial central portion provided with the first, second and third bores, and two covers which close the bores.

As known in itself, and as especially described in the state of the art quoted, the bores may all be through-bores in the central portion, with, normally, an axial spacing piece being inserted into the first bore between the two axle shaft gears. In a preferred embodiment, the pairs of differential gears engage one another only in the central axial portion between the regions of toothing of the axle shaft gears.

If said bearing plates are not used, the bearing bores and oblong holes in accordance with the invention should preferably be provided in the housing covers. To modify the layout, the differential carrier may be adapted by changing the cover plates while using an unchanged central portion.

A preferred embodiment will be described below with reference to the drawings.

BRIEF DESCRIPTION OF THE DRAWINGS

FIG. 1 is a longitudinal section through the differential carrier of a differential drive in accordance with the invention, including axle shaft gears and differential gears.

FIG. 2 is a cross-section through the central portion of the differential carrier of a differential drive in accordance with the invention, including differential gears, according to line B—B of FIG. 1.

DESCRIPTION OF THE PREFERRED EMBODIMENT(S)

Figures 3, 4:
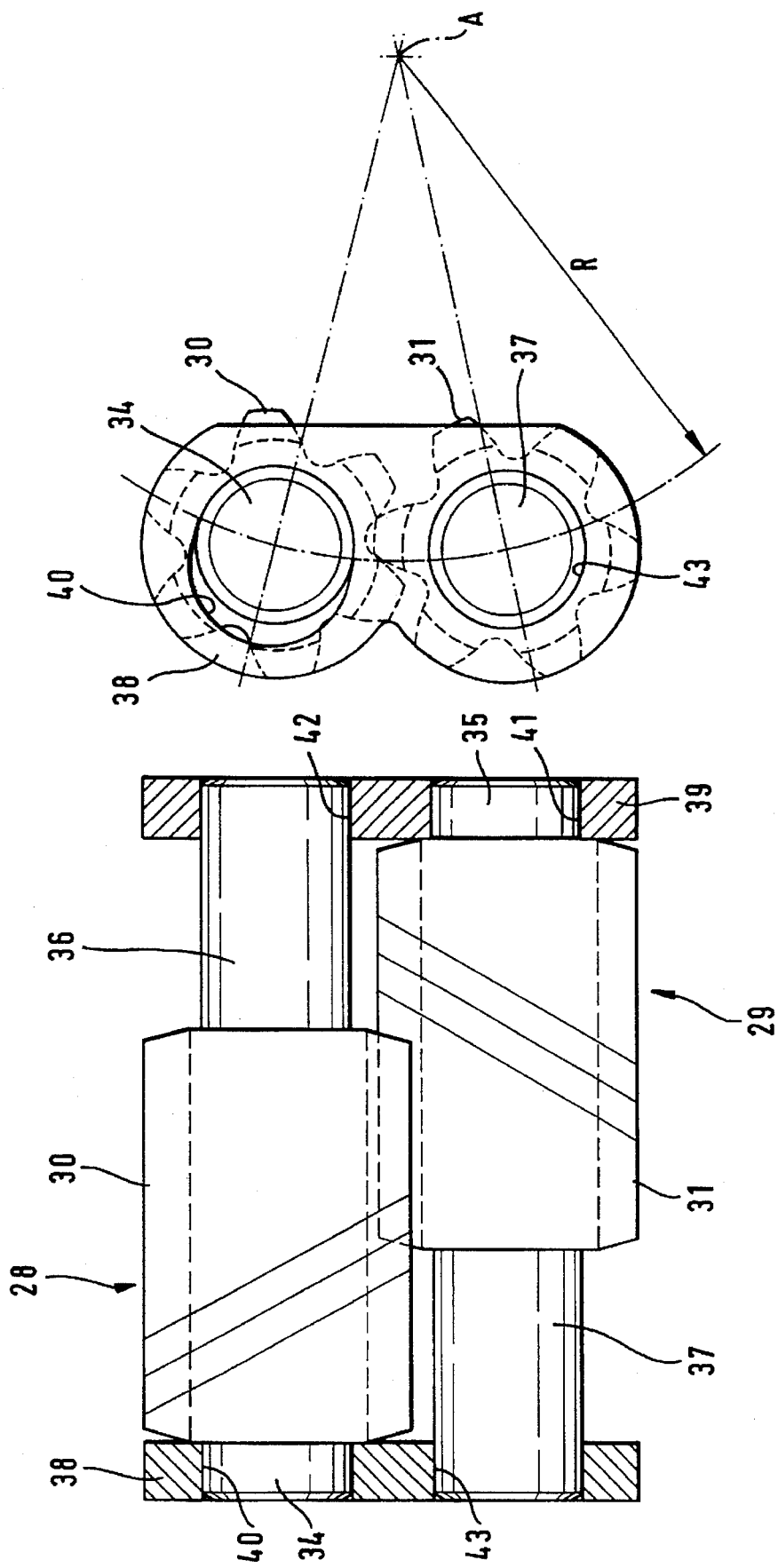
FIG. 3 shows a detail in the form of a longitudinal section through bearing plates of a differential drive in accordance with the invention, including differential gears, according to FIG. 1.
FIG. 4 shows a detail in the form of an axial view of a bearing plate of a differential drive in accordance with the invention, including differential gears, according to FIG. 3.

FIGS. 1 and 2 show the differential carrier 11 of a differential drive in accordance with the invention, with the drive housing not being illustrated. At its ends, the differential carrier 11 is provided with bearing journals 12, 13 by means of which the differential carrier is friction supported or it is supported by rolling-contact bearing in the drive housing (not shown). The differential carrier 11 comprises a central portion 14, a first cover 15 comprising the bearing journal 12 and a second cover 16 comprising the bearing journal 13. At the outside of the central portion 14, there is provided a radial flange 17 to which a driving bevel gear may be threaded; there are provided threaded holes for receiving bolts to be used for this purpose. The central portion 14 comprises a coaxial first bore 19 coaxially supporting two axle shaft gears 20, 21. The axle shaft gear 20 comprises outer toothing 22 whose tooth heads are guided in the first bore 19; the axle shaft gear 21 comprises outer toothing 23 whose tooth heads are also guided in the first bore 19. Both axle shaft gears 20, 21 are axially supported towards the center of the differential carrier 11 on a spacing piece 24 which is axially floatingly supported on a journal projection 25 at the first of the axle shaft gears 20. The axle shaft gears 20, 21 are held axially outwardly in the differential carrier by radial faces 26 at the cover 15 and radial faces 27 at the cover 16. Furthermore, as can be seen more clearly in FIG. 2, the central portion 14 comprises eccentric, axis-parallel second and third bores 32, 33 which are positioned on the same pitch circle and which penetrate one another in pairs and each one also penetrates the first bore 19. In said bores 32, 33 there are arranged differential gears 28, 29 which are circumferentially distributed relative to the axle shaft gears 20, 21 and which each comprise toothed regions 30, 31 whose tooth heads are supported in the second and third bores 32, 33. The toothed regions 30, 31 engage one another in pairs and, as can be seen in FIG. 3, are axially offset relative to one another while overlapping to a limited extent. Furthermore, the toothed regions 30 of the differential gears 28 engage the toothing 22 of the axle shaft gear 20 and the toothed regions 31 of the differential gears 29 engage the toothing 23 of the axle shaft gear 21. At the ends of the differential gears 28, 29 there are provided first short hub extensions 34, 35 pointing towards the associated axle shaft gear and second longer hub extensions 36, 37 pointing in the opposite direction towards the other axle shaft gear.

FIG. 1 shows only one differential gear 28 with its details, whereas FIG. 2 illustrates four circumferentially distributed pairs of differential gears 28, 29. In the central portion 14, in the region between the second and third bores, there are inserted bearing plates 38, 39 each having two bearing bores which, respectively, accommodate the short and long hub extensions of two adjoining differential gears 28, 29. The bearing bores 40, 41 for the short hub extensions 34, 35 are radial oblong holes which guide the hub extensions only laterally, i.e. in the circumferential direction of the differential carrier 11 and which, radially inwardly, form a stop. The bearing bores 42, 43 for the long hub extensions 36, 37 are circular holes. As can be seen in FIG. 2, the centers of the circular holes and the centers of the inner ends of the oblong holes are positioned on a common pitch circle having the radius R. It can be seen that the central portion 14 comprises one of the threaded holes 44 holding the bolt 45 for fixing the cover 16 at the central portion 14.

FIG. 2 shows the central portion 14 with the central first bore 19 and the eccentric axis-parallel second and third bores 32, 33 arranged in pairs; they penetrate one another and each one penetrates the bore 19. The cover and the axle shaft gears with the spacing piece have been removed so that the free passage of the bore 19 is visible. Bearing plates 38, 39 for holding four pairs of differential gears 28, 29 are inserted into the pairs of second and third bores 32, 33. The Figure only shows the front bearing plates 38 with the differential gears 28, 29 guided therein, and the short hub extensions 34 of the differential gears 28 and the long hub extensions 37 of the differential gears 29. The bearing plates 38, 39 are each form-fittingly held in the pairs of bores 32, 33 in the central portion 14 of the differential carrier 11. The oblong shape of the first bearing bores 40, 41 for the short hub extensions—said bores 40, 41 guiding said short hub extensions only laterally—is just as clearly visible as the circular shape of the second bearing bore 42, 43 for the long hub extensions which are held therein without any radial play. The centers of the radial inner ends of the oblong holes and the centers of the circular holes are positioned on a common drawn-in pitch circle with the radius R.

The axes of the oblong holes extend radially, but they could also assume an angle of limited size relative to the radial direction. In respect of the position of their bearing bores, the rear bearing plates 39 (not visible) must be assumed to be orientated in a sense opposite to that of the front bearing plates 38. The Figure also shows edge regions 46, 47 in the region where the second and third bores penetrate the first bore and further edge regions 48 in the region where the second and third bores penetrate one another. As a result of the above-described way of supporting the differential gears 28, 29 by the bearing plates 38, 39, said edge regions 46, 47, 48 are prevented from being subjected to excessive loads caused by the toothed regions of the differential gears. As far as details of the central portion 14 are concerned, the Figure again shows the radial flange 17 and the threaded holes 18 for fixing a driving pinion. Furthermore, there are shown threaded holes 44 which serve to receive bolts for fixing the covers 15, 16 at the central portion 14.

FIGS. 3 and 4 which, below, will be described jointly, show a pair of differential gears 28, 29 arranged so as to extend in opposite senses and a pair of bearing plates 38, 39 which are associated therewith and which are also orientated in opposite senses relative to one another. The differential gear 28 shows its toothed region 30, the short hub extension 34 and the long hub extension 36; the differential gear 29 shows its toothed region 31, the short hub extension 35 and the long hub extension 37. The short hub extensions 34, 35 are guided in bearing bores 40, 41 in the form of radial oblong holes whose centers of their radially inner ends are positioned on the pitch circle R, whereas the long hub extensions 36, 37 are held in a clearance-free way in centered bearing bores 42, 43 in the form of circular holes positioned on said pitch circle R. In the region of the long hub extensions 36, 37, the respective other differential gear, by means of its toothed region, engages the associated axle shaft gear; as can be seen, the parts of the toothed regions 30, 31 directly adjoining the long hub extensions 36, 37 engage one another. By guiding the differential gears 28, 29 in this way, it is possible to eliminate the load on the above-mentioned edge regions at the central portion 14 of the differential carrier. By means of the bearing plates and the large-area form-fitting arrangement of same in the bores 32, 33, all reaction forces of the differential gears are introduced into the central portion. However, in an embodiment deviating from the above, the bearing plates may also be received in cover pockets provided the covers, in turn, are radially accommodated relative to the central portion by load-bearing centering means. According to a further deviating embodiment, the bearing bores, in the same configurations, may be provided directly in the central portion and/or in the cover parts of the differential carrier, while eliminating the bearing plates.

What is claimed is:

1. A differential drive having a drivable differential carrier supported in a drive housing so as to be rotatable around an axis, said differential drive including:

two axle shaft gears which are coaxially supported one behind the other in said differential carrier in first bores and which are each provided with outer toothing and which are connectable to axle shafts emerging from the differential carrier;

a plurality of pairs of differential gears which are supported eccentrically and in an axis-parallel way in said differential carrier in second and third bores and which are each provided with outer toothing covering a portion of the length of said differential gears and with hub extensions of different lengths adjoining said outer toothing at both ends, with the differential gears of the individual pairs being oriented in different directions relative to one another, with the first bores intersecting the second and third bores and the second and third bores intersecting one another, and with the first axle shaft gear engaging the first differential gears of the individual pairs and with the second axle shaft gear engaging the second differential gears of the individual pairs and with the differential gears of the individual pairs engaging one another in at least one axially overlapping region of their outer toothing and with the differential gears, for a purpose of generating friction forces, being supported in the second and third bores by means of tooth heads of their outer toothing;

wherein at each differential gear, the longer hub extension distal from a region of engagement with the associated axle shaft gear is fixed radially and that the shorter hub extension adjoining a region of engagement with the associated axle shaft gear is laterally guided in a radial direction.

2. A differential gear according to claim 1, wherein at each differential gear, the shorter hub extension adjoining the region of engagement with the associated axle shaft gear is supported radially inwardly.

3. A differential drive according to claim 1, wherein there are provided pairs of bearing plates for jointly supporting and guiding the adjoining hub extensions of the individual pairs of differential gears.

4. A differential drive according to claim 3, wherein if viewed in a cross-section, the bearing plates are form-fittingly inserted into the differential carrier.

5. A differential drive according to claim 1, wherein the differential carrier consists of an axial central portion provided with the first, second and third bores and of two covers.

6. A differential drive according to claim 5, wherein the first bores consist of a through-bore in the central portion into which bore a central spacing piece has been inserted.

7. A differential drive according to claim 5, wherein the second and third bores are through-bores in the central portion.

8. A differential drive according to claim 3, wherein the bearing plates are inserted into axial ends of the second and third bores.

9. A differential drive according to claim 5, wherein bearing plates are inserted into countersunk regions in the covers.

10. A differential drive according to claim 1, wherein the differential gears engage one another in a central portion axially between the outer toothings of the axle shaft gears.

11. A differential drive according to claim 3, wherein the bearing plates are inserted into countersunk regions in the covers.

* * * * *

UNITED STATES PATENT AND TRADEMARK OFFICE
CERTIFICATE OF CORRECTION

PATENT NO. : 5,658,214

DATED : August 19, 1997

INVENTOR(S) : Johann Hofstetter and Manfred Hofer

It is certified that error appears in the above-identified patent and that said Letters Patent is hereby corrected as shown below:

Column 4, Line 2 delete "beating" insert --bearing--.

Column 4, Line 48 delete "beating" insert --bearing--.

Signed and Sealed this

Thirty-first Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,658,214

DATED : August 19, 1997

INVENTOR(S) : Hofstetter

It is certified that error appears in the above-identified patent and that said Letters Patent is hereby corrected as shown below:

Column 3, Line 49 insert after "section" --along axis A--.

Column 3, Line 55 delete "B-B" insert --2-2--.

Signed and Sealed this

Twelfth Day of May, 1998

*Attest:*

BRUCE LEHMAN

*Attesting Officer*    Commissioner of Patents and Trademarks